United States Patent
Winger et al.

(10) Patent No.: US 11,031,634 B2
(45) Date of Patent: Jun. 8, 2021

(54) BATTERY WITH MULTIPLE SETS OF OUTPUT TERMINALS AND ADJUSTABLE CAPACITY

(71) Applicant: GM Global Technology Operations LLC, Detroit, MI (US)

(72) Inventors: Lyall K. Winger, Waterloo (CA); Dave G. Rich, Sterling Heights, MI (US); Saad Hasan, Detroit, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 69 days.

(21) Appl. No.: 16/275,809

(22) Filed: Feb. 14, 2019

(65) Prior Publication Data

US 2020/0153051 A1    May 14, 2020

Related U.S. Application Data

(63) Continuation of application No. 16/183,803, filed on Nov. 8, 2018.

(51) Int. Cl.
| | |
|---|---|
| *H01M 10/42* | (2006.01) |
| *B60K 6/28* | (2007.10) |
| *B60L 53/00* | (2019.01) |
| *B60L 50/60* | (2019.01) |
| *H02J 7/34* | (2006.01) |

(52) U.S. Cl.
CPC .......... *H01M 10/425* (2013.01); *B60K 6/28* (2013.01); *B60L 50/66* (2019.02); *B60L 53/00* (2019.02); *H01M 10/4207* (2013.01); *H01M 2010/4271* (2013.01); *H02J 7/345* (2013.01)

(58) Field of Classification Search
CPC ........ H02J 7/0024; H02J 7/345; H01M 10/42; H01M 10/4207; H01M 10/4271
See application file for complete search history.

(56) References Cited

U.S. PATENT DOCUMENTS

| | | | |
|---|---|---|---|
| 6,909,201 B2 | 6/2005 | Musty et al. | |
| 9,184,582 B2 | 11/2015 | Koch et al. | |
| 9,440,600 B2 | 9/2016 | Koch et al. | |
| 9,911,249 B2 | 3/2018 | Koch et al. | |
| 2002/0167291 A1* | 11/2002 | Imai ...................... | H02J 7/1423 320/119 |
| 2005/0093512 A1* | 5/2005 | Mader ................... | H02J 7/0031 320/116 |

(Continued)

FOREIGN PATENT DOCUMENTS

WO    WO-2018/174864 A1    9/2018

OTHER PUBLICATIONS

U.S. Appl. No. 16/013,254, filed Jun. 20, 2018, Rich et al.

(Continued)

*Primary Examiner* — Edward J. Schmiedel

(57) ABSTRACT

A battery control system includes a battery comprising: first and second terminals; third and fourth terminals; a plurality of individually housed batteries; and a plurality of switches configured to connect ones of the batteries to and from ones of the first, second, third, and fourth terminals. A mode module is configured to set a mode of operation based on at least one of a plurality of present operating parameters. A switch control module is configured to control the plurality of switches based on the mode of operation.

16 Claims, 9 Drawing Sheets

(56) References Cited

U.S. PATENT DOCUMENTS

| | | |
|---|---|---|
| 2013/0200848 A1 | 8/2013 | Ozawa et al. |
| 2014/0183939 A1 | 7/2014 | Jiang et al. |
| 2015/0251542 A1 | 9/2015 | Mensah-Brown et al. |
| 2019/0043276 A1 | 2/2019 | Conell et al. |

OTHER PUBLICATIONS

U.S. Appl. No. 16/034,782, filed Jul. 13, 2018, Conell et al.
U.S. Appl. No. 16/053,073, filed Aug. 2, 2018, Conell et al.
U.S. Appl. No. 16/183,895, filed Nov. 8, 2018, Rich et al.
U.S. Appl. No. 16/184,126, filed Nov. 8, 2018, Winger et al.
U.S. Appl. No. 16/183,803, filed Nov. 8, 2018, Winger et al.
U.S. Appl. No. 16/290,457, filed Mar. 1, 2019.

\* cited by examiner

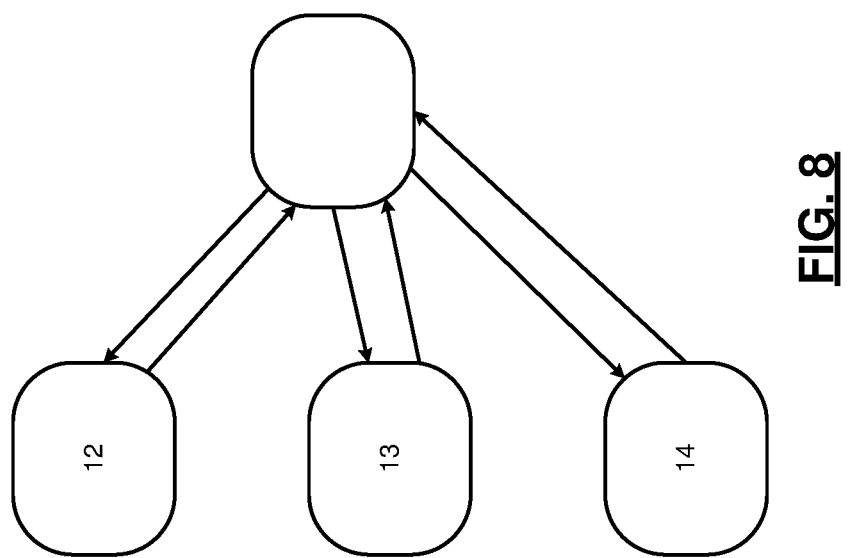

BATTERY WITH MULTIPLE SETS OF OUTPUT TERMINALS AND ADJUSTABLE CAPACITY

CROSS-REFERENCE TO RELATED APPLICATIONS

The present disclosure is a continuation of U.S. patent application Ser. No. 16/183,803, filed on Nov. 8, 2018. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to battery systems of vehicles.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a battery control system includes a battery comprising: first and second terminals; third and fourth terminals; a plurality of individually housed batteries; and a plurality of switches configured to connect ones of the batteries to and from ones of the first, second, third, and fourth terminals. A mode module is configured to set a mode of operation based on at least one of a plurality of present operating parameters. A switch control module is configured to control the plurality of switches based on the mode of operation.

In further features, each of the batteries is a 12 Volt battery.

In further features, the switch control module is configured to control the plurality of switches such that: a first one or more of the batteries are connected to the first and second terminals and provide a first operating voltage at the first and second terminals; and a second one or more of the batteries are connected to the third and fourth terminals and provide a second operating voltage at the third and fourth terminals.

In further features, the first operating voltage is greater than the second operating voltage.

In further features, the first operating voltage is equal to the second operating voltage.

In further features, the first operating voltage is 48 Volts and the second operating voltage is 12 Volts.

In further features, the battery further includes a fifth terminal.

In further features, the switch control module is configured to control the plurality of switches such that: a first one or more of the batteries are connected to the first and second terminals and provide a first operating voltage at the first and second terminals; a second one or more of the batteries are connected to the third and fourth terminals and provide a second operating voltage at the third and fourth terminals; and a third one or more of the batteries are connected to the fifth and fourth terminals and provide a third operating voltage at the fifth and fourth terminals.

In further features, the first operating voltage is greater than the second operating voltage and the second operating voltage is equal to the third operating voltage.

In further features, the first operating voltage is equal to the second operating voltage and the third operating voltage is greater than the first operating voltage.

In further features, the first operating voltage is 48 Volts, the second operating voltage is 12 Volts, and the third operating voltage is 12 V.

In further features, the switch control module is configured to: in response to the mode of operation being a first mode, control the plurality of switches such that: a first portion of the batteries is connected to the first and second terminals; and a second portion of the batteries is connected to the third and fourth terminals; and in response to the mode of operation being a second mode, control the plurality of switches such that: a third portion of the batteries is connected to the first and second terminals; and a fourth portion of the batteries is connected to the third and fourth terminals.

In further features: the first portion of the batteries includes a greater number of the batteries than the third portion of the batteries; and the second portion of the batteries includes a lesser number of the batteries than the fourth portion of the batteries.

In further features, the battery further includes a fifth terminal, and wherein the switch control module is configured to: in response to the mode of operation being a first mode, control the plurality of switches such that: a first portion of the batteries is connected to the first and second terminals; a second portion of the batteries is connected to the third and fourth terminals; and a third portion of the batteries is connected to the fourth and fifth terminals; and in response to the mode of operation being a second mode, control the plurality of switches such that: a fourth portion of the batteries is connected to the first and second terminals; a fifth portion of the batteries is connected to the third and fourth terminals; and a sixth portion of the batteries is connected to the fourth and fifth terminals.

In further features, the switch control module is configured to control the switches to electrically isolate one of the batteries in response to detection of a fault in the one of the batteries.

In further features, a pre-charge circuit includes a capacitor that is connected in parallel with the first and second terminals, where the pre-charge circuit is configured to connect one of the batteries to the capacitor.

In further features, the pre-charge circuit is further configured to connect a second one of the batteries to the capacitor in response to a determination that the capacitor has been charged to a predetermined voltage.

In further features, the pre-charge circuit further includes a resistor and an inductor connected in series, wherein the resistor and the inductor are connected in parallel with the first and second terminals.

In further features, a second pre-charge circuit includes a second capacitor that is connected in parallel with the third and fourth terminals, where the pre-charge circuit is configured to connect one of the batteries to the capacitor.

In a feature, a battery control system includes: a battery comprising: first, second, and third terminals; a plurality of individually housed batteries; and a plurality of switches configured to connect ones of the batteries to and from ones of the first, second, and third terminals; a mode module is configured to set a mode of operation based on at least one of a plurality of present operating parameters; and a switch control module is configured to control the plurality of switches based on the mode of operation.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7 and 8 are example state diagram illustrative of modes of operation and control of switches of a battery.

In the drawings, reference numbers may be reused to identify similar and/or identical elements.

DETAILED DESCRIPTION

A vehicle includes a battery having a first output terminals on a housing of the battery for outputting a first operating voltage (e.g., 12 V or 48 V) and second output terminals on the housing for outputting a second operating voltage (e.g., 12 V or 48V). The battery includes a plurality of individually housed batteries and a plurality of switches. A switch control module controls the switches to connect ones of the individual batteries to the first and second output terminals and to provide target capacities and output voltages at the first and second output terminals. The switch control module may set the target capacities, for example, based on a mode of operation of the vehicle (e.g., cranking, auxiliary, run, etc.).

The battery may include a pre-charge circuit that is connected in parallel to the first output terminals or the second output terminals. In various implementations, one pre-charge circuit may be connected to the first output terminals and one pre-charge circuit may be connected to the second output terminals. The pre-charge circuit gradually increases a voltage applied to the output terminals to eliminate transient voltages that could otherwise occur when one or more of the individual batteries are connected to the output terminals.

Figure 1:
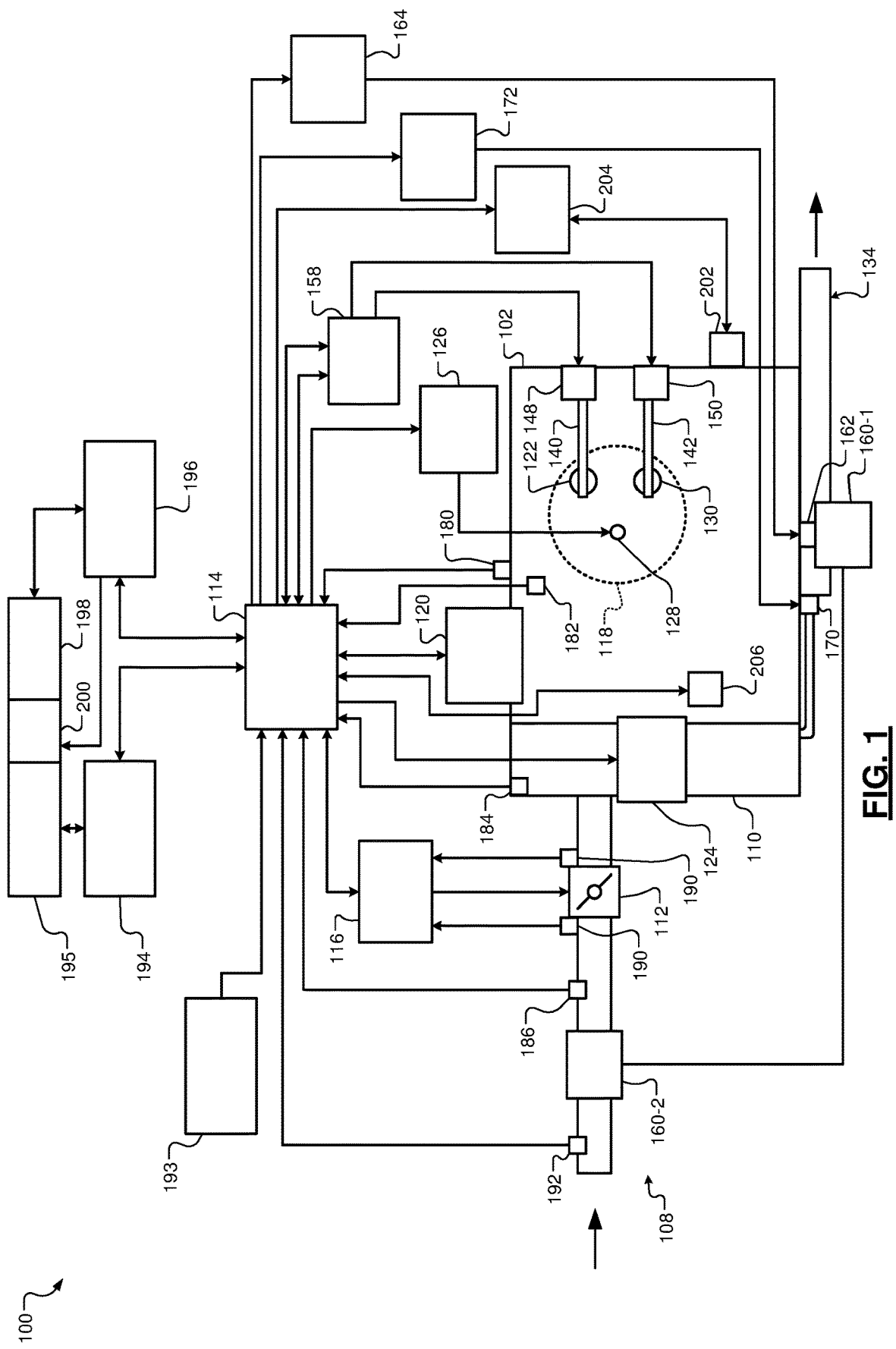
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 to the electric motor 198 to cause the electric motor 198 to output positive torque. The battery is discussed further below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the battery 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the battery 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

Figure 2:
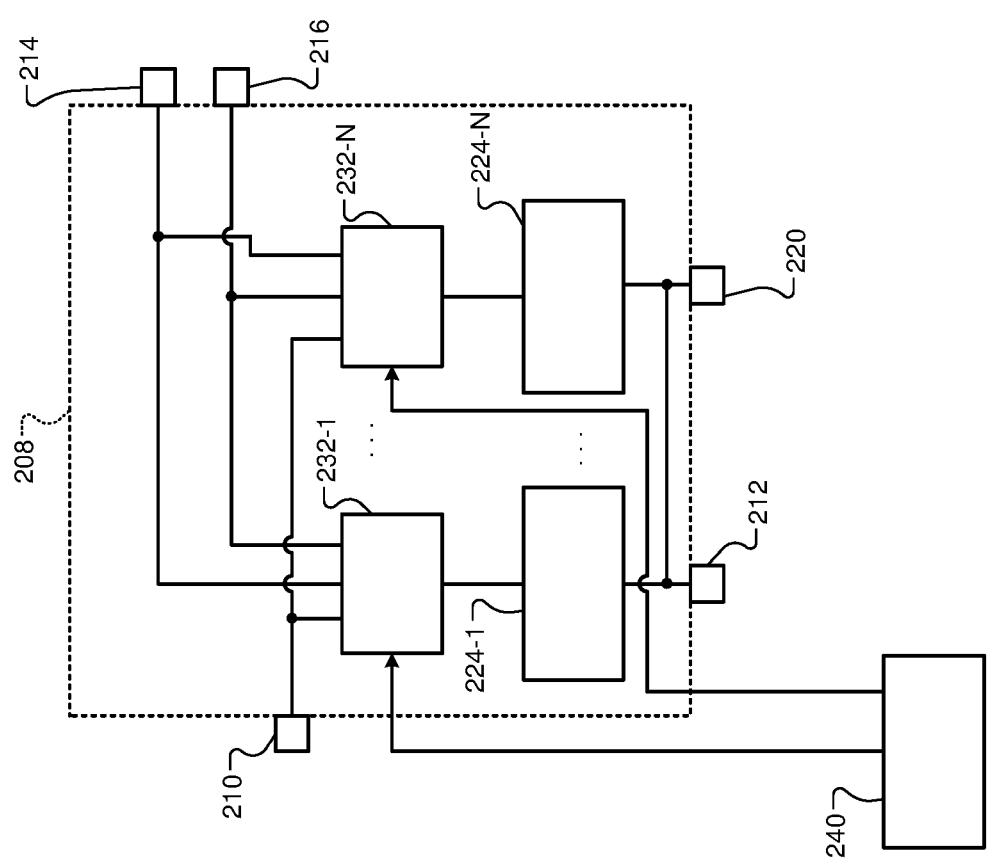
FIG. 2 is a functional block diagram an example electrical system of a vehicle.

FIG. 2 is a functional block diagram of an example electrical system of the vehicle. The electrical system includes the battery 208 discussed above.

The battery 208 has two or more different sets of output terminals to provide two or more direct current (DC) operating voltages. Each set of output terminals includes a positive terminal and a negative terminal. Two or more sets of output terminals may share a negative terminal, or the negative terminals of two or more sets may be internally connected within the battery 208 or externally connected. For example only, the battery 208 may have a first positive (e.g., 48 Volt (V)) terminal 210, a first negative terminal 212, a second positive (e.g., a first 12 V) terminal 214, a third positive (e.g., a second 12 V) terminal 216, and a second negative terminal 220. While the example of the battery 208 having a 48 V operating voltage and two 12 V operating voltages is provided, the battery 208 may have one or more other operating voltages, such as only two 12 V operating voltages, only two 48 V operating voltages, two 48 V operating voltages and a 12 V operating voltage, or a combination of two or more other suitable operating voltages.

The battery 208 includes a plurality of individual batteries, such as a first battery 224-1, . . . , and an N-th battery 224-N ("batteries 224"), where N is an integer greater than or equal to 2. In various implementations, N may be equal to 6, 8, 10, or 12. Each of the batteries 224 may include one or more battery cells, and each of the batteries 224 may be separately replaceable within the battery 208. For example only, each of the batteries 224 may be an individually housed 12 V DC battery. The ability to individually replace the batteries 224 may enable the battery 208 to include a shorter warranty period and have a lower warranty cost. The batteries 224 are also individually isolatable, for example, in the event of a fault in a battery module. In various implementations, the battery 208 may have the form factor of a standard automotive grade 12 V battery.

Each of the batteries 224 has its own separate capacity (e.g., in amp hours, Ah). The battery 208 includes a plurality of switches, such as first switches 232-1, . . . , N-th switches 232-N (collectively "switches 232"). The switches 232 enable the batteries 224 to be connected in series, parallel, or combinations of series and parallel to provide desired output voltages and capacities at the output terminals.

A switch control module 240 controls the switches 232 to provide desired output voltages and capacities at the output terminals. The switch control module 240 controls the switches 232 to vary the capacity provided at the output terminals based on a present operating mode of the vehicle, as discussed further below.

Figure 3A:
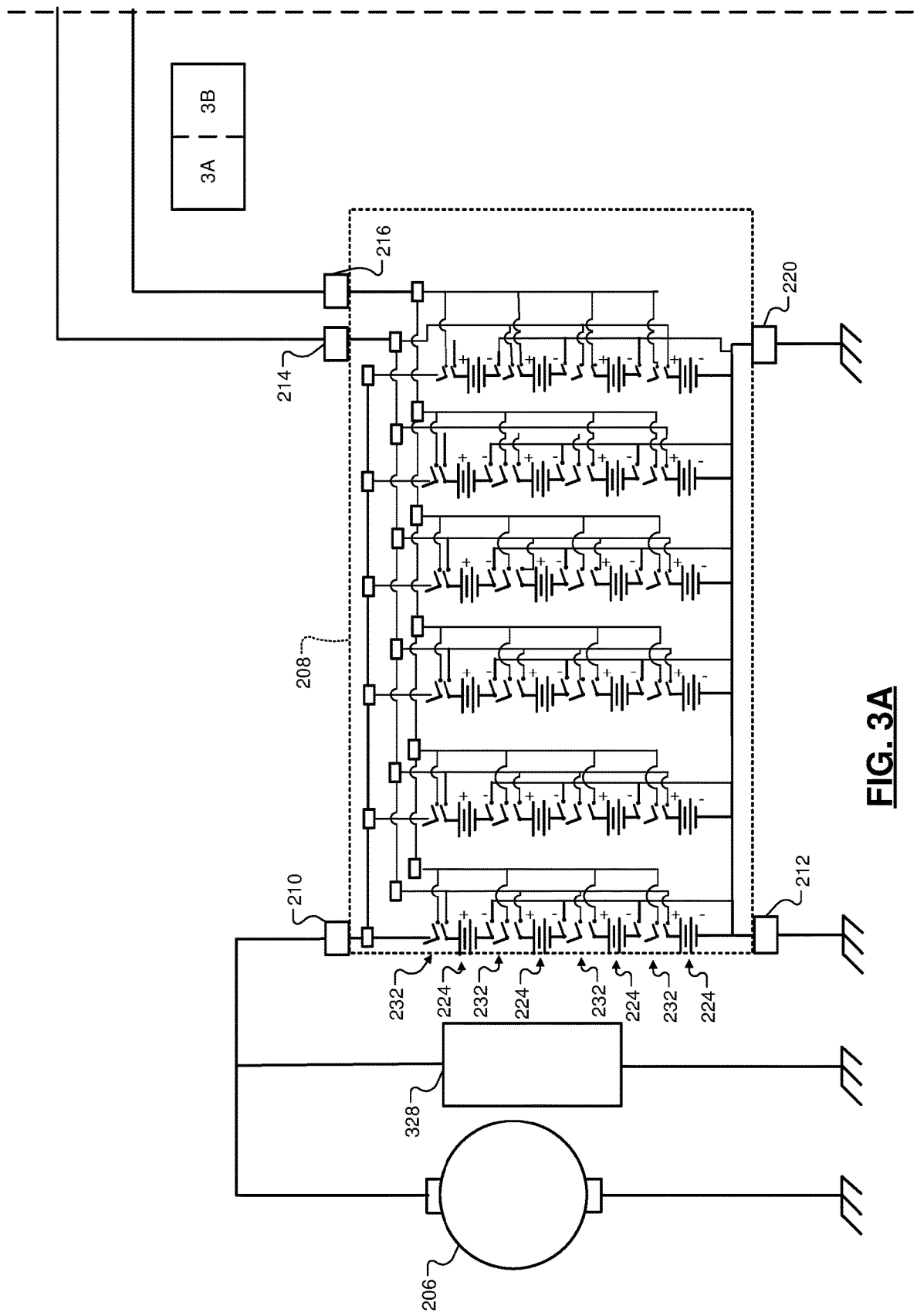
FIGS. 3A-3B are a schematic including an example implementation of a battery.
Figure 3B:
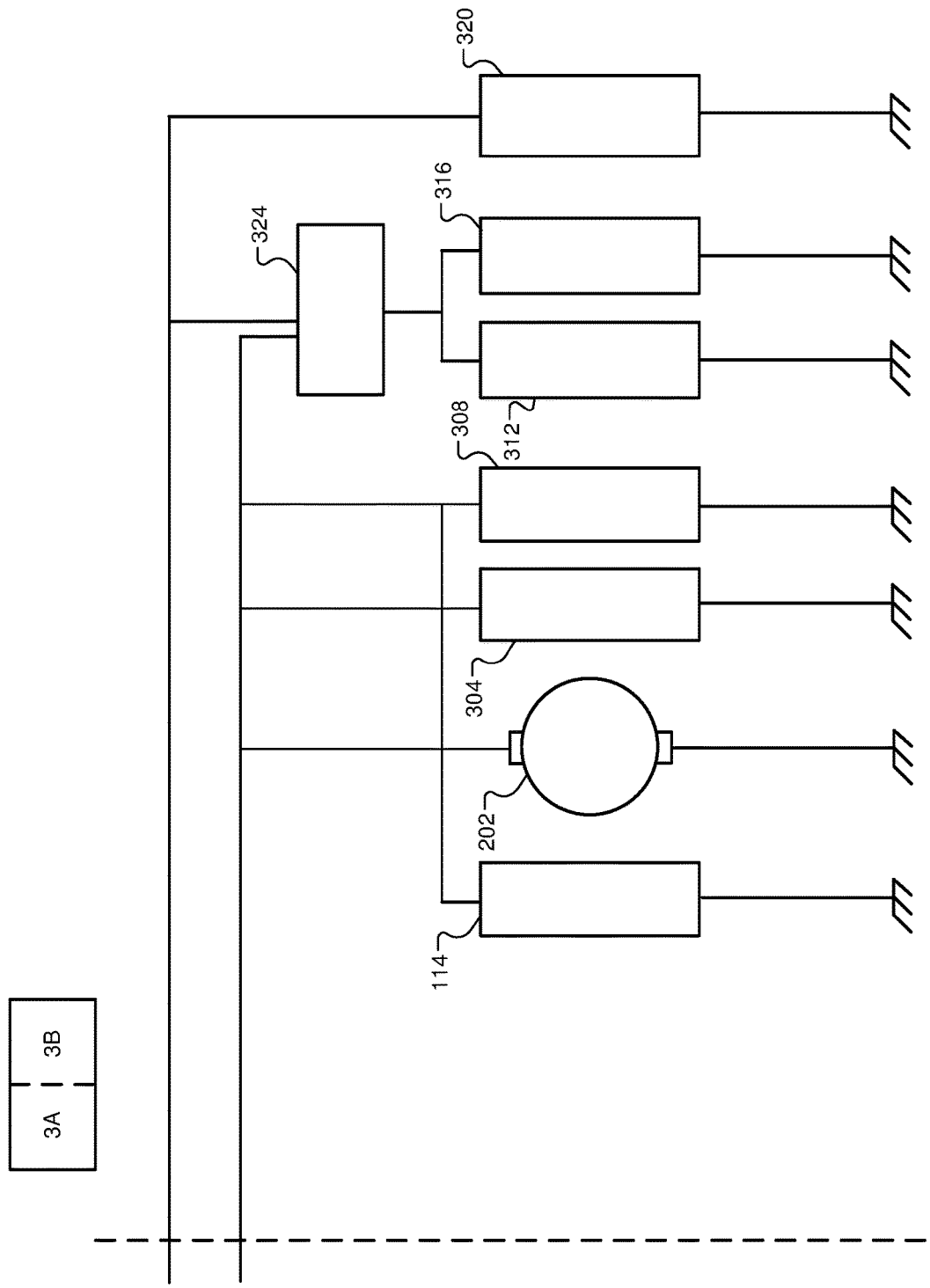

FIGS. 3A-3B are a schematic including an example implementation of the battery 208. In the example of FIG. 3A, sets of 4 of the batteries 224 (e.g., 12 V batteries) are connectable in series (via ones of the switches 232) to the first positive terminal 210 and the first negative terminal 212 to provide a first output voltage (e.g., 48 V). Individual ones of the batteries 224 can be connected (via ones of the switches 232) to the second positive terminal 214 or the third positive terminal 216 and the second negative terminal 220 to provide a second output voltage (e.g., 12 V) at the second and third positive terminals 214 and 216. How many of the batteries 224 are connected to the first positive terminal 210, the second positive terminal 214, and the third positive terminal 216 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the ECM 114 and other control modules of the vehicle, the starter motor 202, and/or other electrical loads, such as first 12 V loads 304, second 12 V loads 308, other control modules 312, third 12 V loads 316, and fourth 12 V loads 320. In various implementations, a switching device 324 may be connected to both of the first and second positive terminals 214. The switching device 324 may connect the other control modules 312 and the third 12 V loads 316 to the second positive terminal 214 or the third positive terminal 216.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to recharge the battery 208.

Each of the switches 232 may be an insulated gate bipolar transistor (IGBT), a field effect transistor (FET), such as a metal oxide semiconductor FET (MOSFET), or another suitable type of switch.

Figure 4:
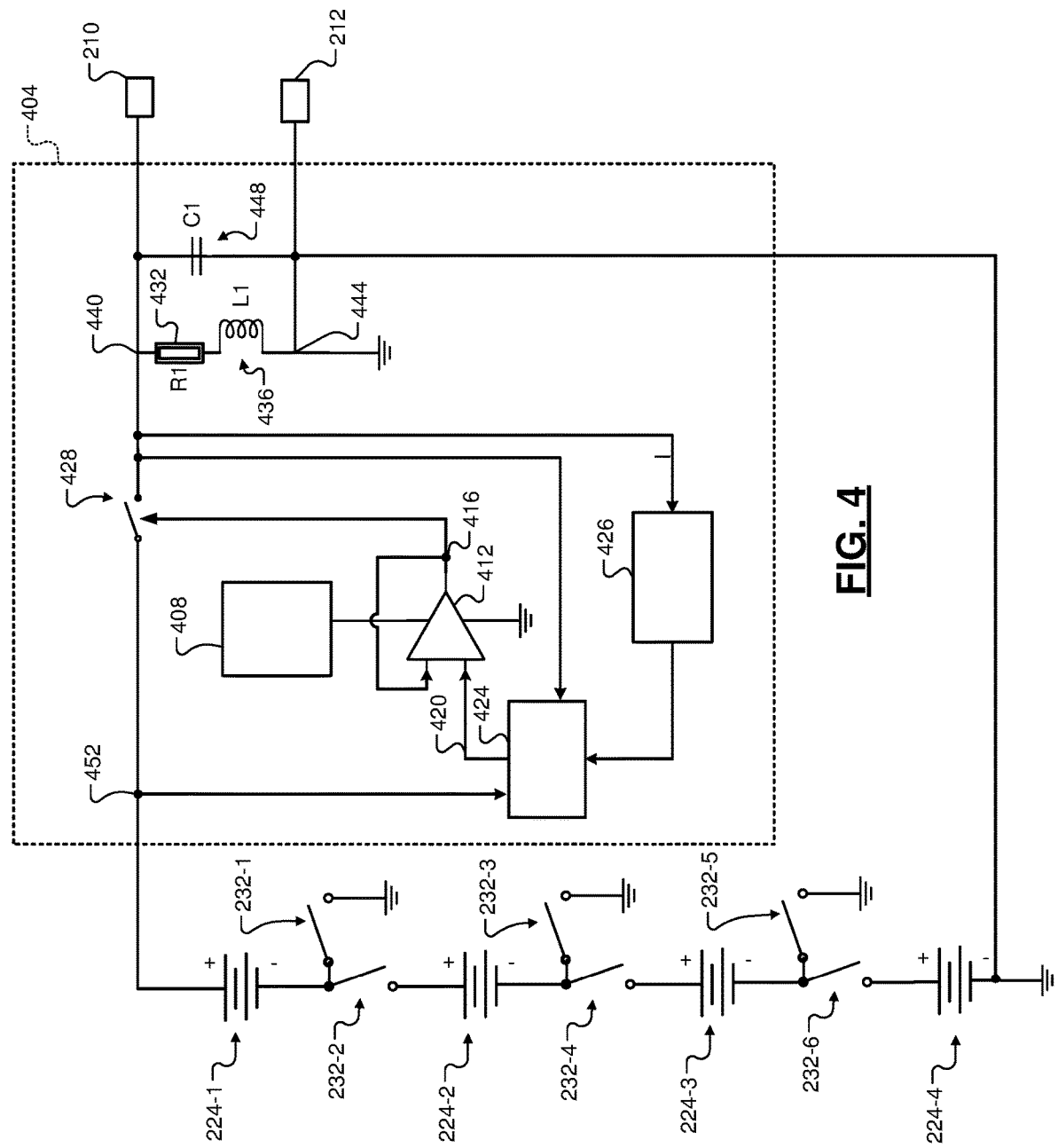
FIG. 4 includes a schematic of an example of a pre-charge circuit.

The battery 208 may also include one or more pre-charge circuits. FIG. 4 includes a schematic of an example of a pre-charge circuit 404 for the output at the first positive terminal 210 and the first negative terminal 212. The pre-charge circuit 404 is connected to four of the batteries 224-1, 224-2, 224-3, and 224-4.

The pre-charge circuit 404 includes a charge pump 408 that powers a comparator 412. The comparator 412 switches its output 416 based on a comparison of the output and an output 420 from a digital to analog converter (DAC) 424. More specifically, the comparator 412 sets the output 416 to a first state (e.g., a high voltage, or digital 1) when the output of the DAC 424 is greater than the output 416. The comparator 412 sets the output 416 to a second state (e.g., a low voltage, or digital 0) when the output of the DAC 424 is less than the output 416. An analog to digital converter (ADC) 426 converts analog current (I) measurements to digital values and supplies the digital values (corresponding to current) to the DAC 424.

A pre-charge switch (Q1) 428 opens and closes based on the state of the output 416. For example, the pre-charge switch 428 closes when the output 416 is in the first state and opens when the output 416 is in the second state. A resistor 432 and an inductor 436 are connected in series between an output node 440 and a node 444 that is connected to a ground potential. A pre-charge capacitor 448 is connected in parallel with the resistor 432 and the inductor 436 between the output node 440 and the node 444. The first positive terminal 210 is connected to the output node 440, and the first negative terminal 212 is connected to the node 444.

When the pre-charge switch 428 is closed, one or more of the batteries 224-1, 224-2, 224-3, and 224-4 that are connected to an input 452 of the pre-charge switch 428 charge the pre-charge capacitor 448. First, second, third, fourth, fifth, and sixth switches (SW1, SW2, SW3, SW4, SW5, and SW6) 232-1, 232-2, 232-3, 232-4, 232-5, and 232-6 control connection of the batteries 224-1, 224-2, 224-3, and 224-4 to the input 452 of the pre-charge switch 428 and to the ground potential. While the example of the batteries 224-1, 224-2, 224-3, and 224-4 is provided, a pre-charge circuit similar to the pre-charge circuit 428 could additionally or alternatively be connected to each of the batteries 224 and to the second or third positive terminals 214 and 216.

Figure 5:
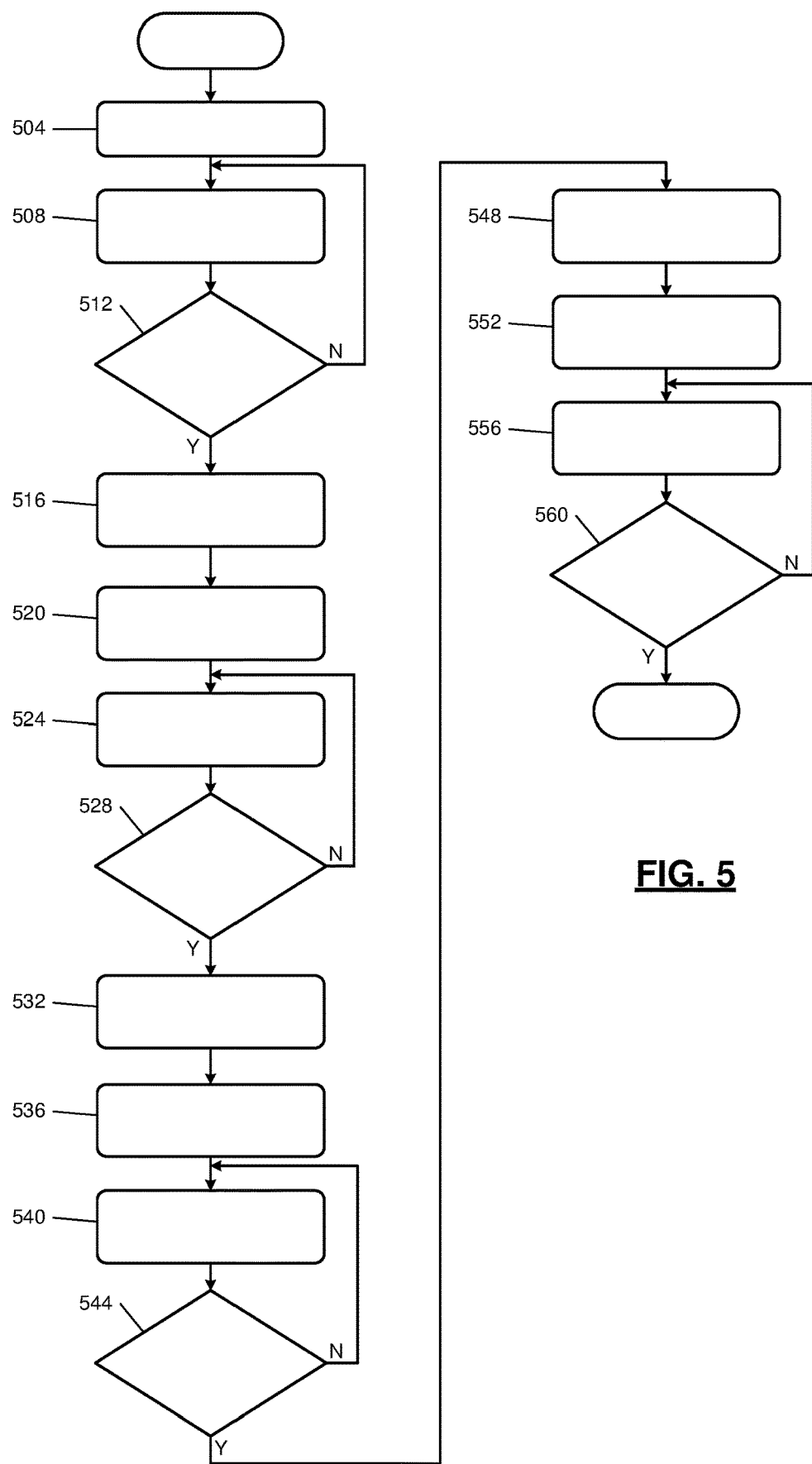
FIG. 5 is a flowchart depicting an example method of controlling pre-charging of a pre-charge capacitor of a pre-charge circuit.

FIG. 5 is a flowchart depicting an example method of controlling the charging of the pre-charge capacitor 448. Control begins with 504 where the switch control module 240 closes the first switch 232-1. The second, third, fourth, fifth, and sixth switches 232-2, 232-3, 232-4, 232-5, and 232-6 are open. The first battery 224-1 charges the pre-charge capacitor 448 when the pre-charge switch 428 is closed.

At 508, the DAC 424 increases its output 420 based on the current through the pre-charge switch 428 to limit a rate of change in the current to a predetermined rate of change of current. The comparator 412 switches based on the output 420 of the DAC 424, and the pre-charge switch 428 opens and closes based on the output 416 of the comparator 412.

At 512, the DAC 424 determines whether the voltage at the input 452 minus the voltage at the output node 440 is greater than a first predetermined voltage change (Vchange1). If 512 is true, control continues with 516. If 512 is false, control returns to 508. The first predetermined voltage change may be calibratable and may be set, for example, to approximately 90 percent of the input voltage 452 at the time when the first switch 232-1 was closed before the pre-charge switch 428 was closed.

At 516, the DAC 424 sets the output 420 to cause the comparator 412 to open the pre-charge switch 428. For example, the DAC 424 may set the output 420 to a predetermined low value. At 520, the switch control module 240 opens the first switch 232-1 and closes the second switch 232-2 and the third switch 232-3. The first, fourth, fifth, and sixth switches 232-1, 232-4, 232-5, and 232-6 are open. The first battery 224-1 and the second battery 224-2 charge the pre-charge capacitor 448 when the pre-charge switch 428 is closed.

At 524, the DAC 424 increases the output 420 based on the current through the pre-charge switch 428 to limit the rate of change in the current to the predetermined rate of change of current. The comparator 412 switches based on the output 420 of the DAC 424, and the pre-charge switch 428 opens and closes based on the output 416 of the comparator 412.

At 528, the DAC 424 determines whether the voltage at the input 452 minus the voltage at the output node 440 is greater than a second predetermined voltage change (Vchange2). If 528 is true, control continues with 532. If 528 is false, control returns to 524. The second predetermined voltage change may be calibratable and may be set, for example, to approximately 90 percent of the input voltage 452 at the time when the second and third switches 232-2 and 232-3 were closed before the pre-charge switch 428 was closed.

At 532, the DAC 424 sets the output 420 to cause the comparator 412 to open the pre-charge switch 428. For example, the DAC 424 may set the output 420 to the predetermined low value. At 536, the switch control module 240 opens the third switch 232-3 and closes the fourth and fifth switches 232-4 and 232-5. The first, third, and sixth switches 232-1, 232-3, and 232-6 are open. The first battery 224-1, the second battery 224-2, and the third battery 224-3 charge the pre-charge capacitor 448 when the pre-charge switch 428 is closed.

At 540, the DAC 424 increases the output 420 based on the current through the pre-charge switch 428 to limit the rate of change in the current to the predetermined rate of change of current. The comparator 412 switches based on the output 420 of the DAC 424, and the pre-charge switch 428 opens and closes based on the output 416 of the comparator 412.

At 544, the DAC 424 determines whether the voltage at the input 452 minus the voltage at the output node 440 is greater than a third predetermined voltage change (Vchange3). If 544 is true, control continues with 548. If 544 is false, control returns to 540. The third predetermined voltage change may be calibratable and may be set, for example, to approximately 90 percent of the input voltage 452 at the time when the fourth and fifth switches 232-4 and 232-5 were closed before the pre-charge switch 428 was closed.

At 548, the DAC 424 sets the output 420 to cause the comparator 412 to open the pre-charge switch 428. For example, the DAC 424 may set the output 420 to a predetermined low value. At 552, the switch control module 240 opens the fifth switch 232-5 and closes the sixth switch 232-6. The first, third, and fifth switches 232-1, 232-3, and 232-5 are open. The first battery 224-1, the second battery 224-2, the third battery 224-3, and the fourth battery 224-4 charge the pre-charge capacitor 448 when the pre-charge switch 428 is closed.

At 556, the DAC 424 increases the output 420 based on the current through the pre-charge switch 428 to limit the rate of change in the current to the predetermined rate of change of current. The comparator 412 switches based on the output 420 of the DAC 424, and the pre-charge switch 428 opens and closes based on the output 416 of the comparator 412.

At 560, the DAC 424 determines whether the voltage at the input 452 minus the voltage at the output node 440 is greater than a fourth predetermined voltage change (Vchange4). If 560 is true, control ends the pre-charging process. If 560 is false, control returns to 556. The fourth predetermined voltage change may be calibratable and may be set, for example, to approximately 90 percent of the input voltage 452 at the time when the sixth switch 232-6 was closed before the pre-charge switch 428 was closed. While control is shown and discussed as ending, control may return to 504 when voltage output from the first positive and negative terminals 210 and 212 is next transitioned from off to on.

Figure 6:
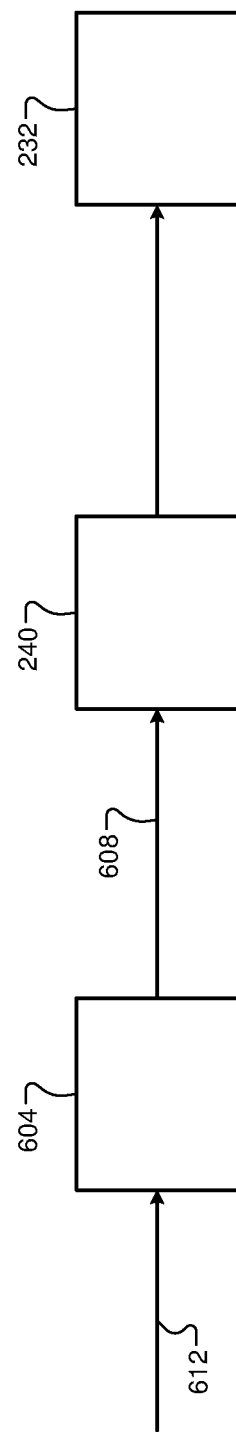
FIG. 6 includes a functional block diagram of an example capacity control system.

FIG. 6 is a functional block diagram of an example capacity control system. A mode module 604 sets an operating mode 608 based on one or more operating parameters 612. The switch control module 240 controls the switches 232 of the battery 208 based on the operating mode 608 to control how much of the total capacity of the battery 208 is connected to the first positive terminal 210, how much of the capacity of the battery 208 is connected to the second positive terminal 214, and how much of the capacity of the battery 208 is connected to the third positive terminal 216.

Figure 7:
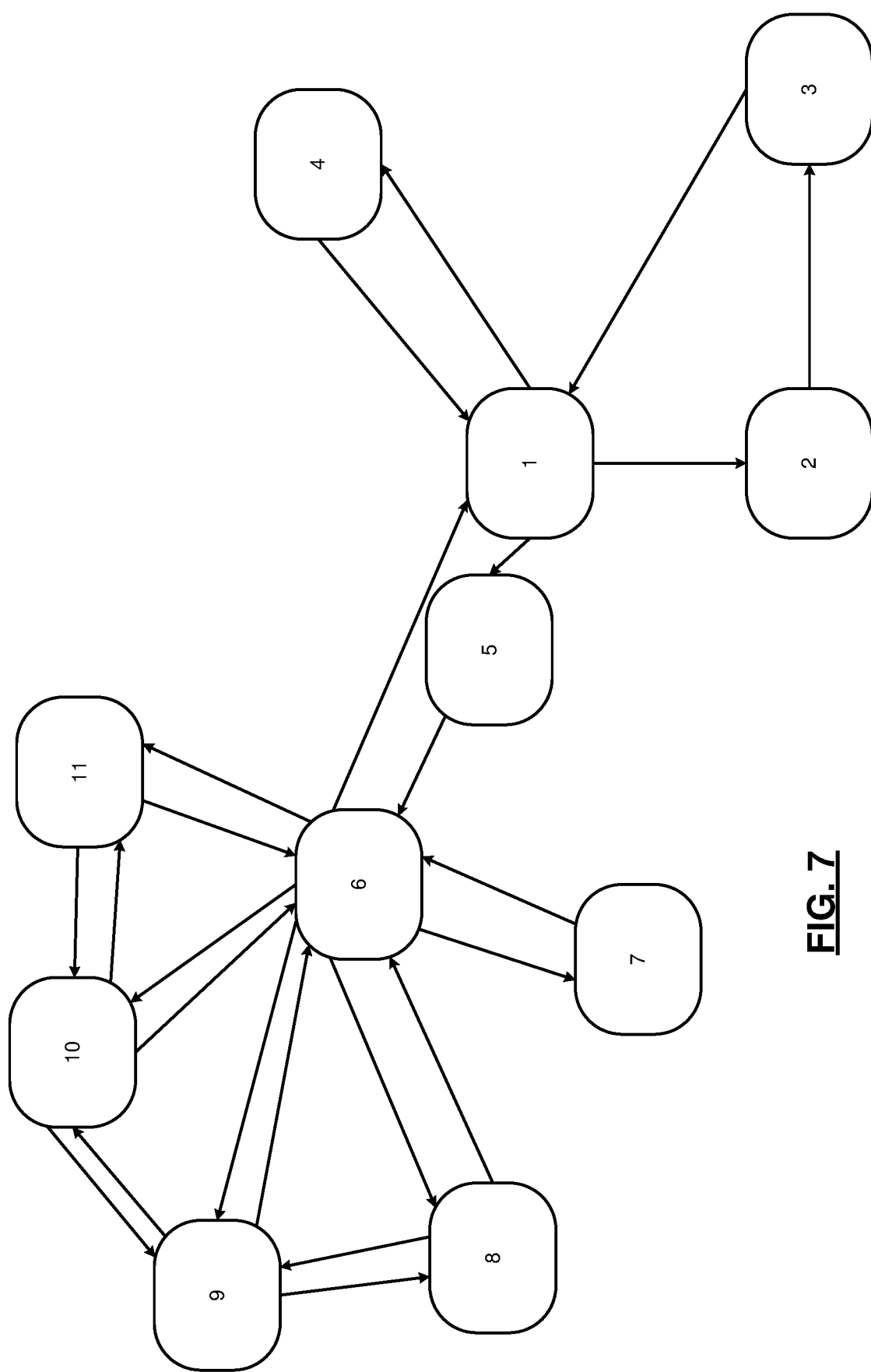

FIG. 7 is a state diagram illustrative of modes of operation and control of the switches. With respect to FIGS. 6 and 7, the mode module 604 sets the operating mode 608 to a first mode (e.g., a vehicle off mode), for example, when an ignition system of the vehicle is off. The first mode is illustrated by 1 in FIG. 7.

The mode module 604 may transition the operating mode 608 from the first mode to a second mode (e.g., a power off mode), for example, when at least one of: all of the batteries 224 are disconnected from the first positive terminal 210; all of the batteries 224 are disconnected from the second positive terminal 214; and all of the batteries 224 are disconnected from the third positive terminal 216. The second mode is illustrated by 2 in FIG. 7.

The mode module 604 may transition the operating mode 608 from the second mode to a third mode (e.g., a pre-charge mode), for example, when at least one of the batteries 224 is transitioned to being connected to one of the positive terminals following all of the batteries 224 being disconnected from that positive terminal. In other words, the mode module 604 may transition the operating mode 608 from the second mode to the third mode when the pre-charge circuit 404 is charging the pre-charge capacitor 448 that is connected to that positive terminal. The third mode is illustrated by 3 in FIG. 7.

The mode module 604 may transition the operating mode 608 from the third mode to the first mode when the pre-charging is complete.

The mode module 604 may transition the operating mode 608 from the first mode to a fourth mode (e.g., an auxiliary mode), for example, when the ignition system is in an auxiliary state. The engine 102 may not be running in the auxiliary state, but some vehicle electronic components may be powered. The fourth mode is illustrated by 4 in FIG. 7.

The mode module 604 may transition the operating mode 608 to a fifth mode (e.g., a cranking mode) during cranking of the engine 102. The fifth mode is illustrated by 5 in FIG. 7. The mode module 604 may transition the operating mode 608 to a sixth mode (e.g., a run mode), for example, when the engine 102 reaches the running state after cranking. The sixth mode is illustrated by 6 in FIG. 7.

The mode module 604 may transition the operating mode 608 to a seventh mode, for example, during the auto-stop portion of an auto-stop/start event. The seventh mode is illustrated by 7 in FIG. 7. The mode module 604 may transition the operating mode 608 to an eighth mode, for example, based on at least one of a brake pedal position (BPP), an accelerator pedal position (APP), a state of charge (SOC) of the battery 208, a temperature of the battery, and one or more other ones of the operating parameters 612. The eighth mode is illustrated by 8 in FIG. 7.

The mode module 604 may transition the operating mode 608 to a ninth mode, for example, based on at least one of the BPP, the APP, the SOC of the battery 208, the temperature of the battery, and one or more other ones of the operating parameters 612. The ninth mode is illustrated by 9 in FIG. 7.

The mode module 604 may transition the operating mode 608 to a tenth mode, for example, based on at least one of the BPP, the APP, the SOC of the battery 208, the temperature of the battery, and one or more other ones of the operating parameters 612. The tenth mode is illustrated by 10 in FIG. 7. The mode module 604 may transition the operating mode 608 to an eleventh mode, for example, based on at least one of the BPP, the APP, the SOC of the battery 208, the temperature of the battery, and one or more other ones of the operating parameters 612. The eleventh mode is illustrated by 11 in FIG. 7.

FIG. 8 includes a state diagram including additional modes of operation. For example, the mode module 604 may transition the operating mode 608 from any other mode to a twelfth mode, for example, when the voltage at the first positive terminal 210 and the first negative terminal 212 is above a predetermined upper limit voltage or less than a predetermined lower limit voltage. The twelfth mode is illustrated by 12 in FIG. 8.

The mode module 604 may transition the operating mode 608 from any other mode to a thirteenth mode, for example, when the voltage at the second positive terminal 214 and the second negative terminal 220 is above a predetermined upper limit voltage or less than a predetermined lower limit voltage. The thirteenth mode is illustrated by 13 in FIG. 8.

The mode module 604 may transition the operating mode 608 from any other mode to a fourteenth mode, for example, when the voltage at the third positive terminal 216 and the second negative terminal 220 is above a predetermined upper limit voltage or less than a predetermined lower limit voltage. The fourteenth mode is illustrated by 14 in FIG. 8.

When the operating mode 608 is in the first mode, the switch control module 240 controls the switches 232 of the battery 208 based on a first predetermined capacity allotment. The first predetermined capacity allotment may include, for example, connecting the entire capacity of the battery 208 to the second positive terminal 214 and the second negative terminal 220. No capacity of the battery 208 will be connected to the third positive terminal 216 or the first positive terminal 210 in the first predetermined capacity allotment.

When the operating mode 608 is in the second mode, the switch control module 240 controls the switches 232 of the battery 208 based on a second predetermined capacity allotment. The second predetermined capacity allotment may include, for example, connecting none of the capacity of the battery 208 to one of the terminals that is to be disconnected from a positive terminal. The entire capacity of the battery 208 may be connected to no positive terminals or to other positive terminals that are not to be disconnected.

When the operating mode 608 is in the third mode, the switch control module 240 controls the switches 232 of the battery 208 based on a third predetermined capacity allotment. The third predetermined capacity allotment may include, for example, connecting a first predetermined portion of the total capacity of the battery 208 to one of the positive terminals that is to be connected.

When the operating mode 608 is in the third mode, the switch control module 240 controls the switches 232 of the battery 208 based on a third predetermined capacity allotment. The third predetermined capacity allotment may include, for example, connecting a first predetermined portion of the total capacity of the battery 208 to one of the positive terminals that is to be connected. The first predetermined portion may be greater than zero and less than 100 percent of the total capacity of the battery 208.

When the operating mode 608 is in the fourth mode, the switch control module 240 controls the switches 232 of the battery 208 based on a fourth predetermined capacity allotment. The fourth predetermined capacity allotment may include, for example, connecting the total capacity of the battery 208 to the second positive terminal 214. No capacity of the battery 208 will be connected to the third positive terminal 216 or the first positive terminal 210 in the fourth predetermined capacity allotment.

When the operating mode 608 is in the fifth mode, the switch control module 240 controls the switches 232 of the battery 208 based on a fifth predetermined capacity allotment. The fifth predetermined capacity allotment may include, for example, connecting the total capacity of the battery 208 to the second positive terminal 214. No capacity of the battery 208 will be connected to the third positive terminal 216 or the first positive terminal 210 in the fifth predetermined capacity allotment.

When the operating mode 608 is in the sixth mode, the switch control module 240 controls the switches 232 of the battery 208 based on a sixth predetermined capacity allotment. The sixth predetermined capacity allotment may include, for example, connecting second, third, and fourth predetermined portions of the total capacity of the battery 208 to the first, second, and third positive terminals 210, 214, and 216, respectively. The second predetermined portion may be, for example, approximately one ninth of the total capacity of the battery 208, the third predetermined portion may be approximately one third of the total capacity of the battery 208, and the fourth predetermined portion may be approximately two ninths of the total capacity of the battery 208. As used herein, approximately may be +/−10%.

When the operating mode 608 is in the seventh mode, the switch control module 240 controls the switches 232 of the battery 208 based on a seventh predetermined capacity allotment. The seventh predetermined capacity allotment may include, for example, connecting a fifth, sixth, and seventh predetermined portions of the total capacity of the battery 208 to the first, second, and third positive terminals, 210, 214, and 216, respectively. The fifth predetermined portion may be, for example, approximately zero percent of the total capacity of the battery 208, the sixth predetermined portion may be approximately five sixths of the total capacity of the battery 208, and the seventh predetermined portion may be approximately one sixth of the total capacity of the battery 208.

When the operating mode 608 is in the eighth mode, the switch control module 240 controls the switches 232 of the battery 208 based on an eighth predetermined capacity allotment. The eighth predetermined capacity allotment may include, for example, connecting eighth, ninth, and tenth predetermined portions of the total capacity of the battery 208 to the first, second, and third positive terminals, 210, 214, and 216, respectively. The eighth predetermined portion may be, for example, approximately one sixth of the total capacity of the battery 208, the ninth predetermined portion may be approximately one half of the total capacity of the battery 208, and the tenth predetermined portion may be approximately one third of the total capacity of the battery 208.

When the operating mode 608 is in the ninth mode, the switch control module 240 controls the switches 232 of the battery 208 based on a ninth predetermined capacity allotment. The ninth predetermined capacity allotment may include, for example, connecting eleventh, twelfth, and thirteenth predetermined portions of the total capacity of the battery 208 to the first, second, and third positive terminals, 210, 214, and 216, respectively. The eleventh predetermined portion may be, for example, approximately one third of the total capacity of the battery 208, the twelfth predetermined portion may be approximately one third of the total capacity of the battery 208, and the thirteenth predetermined portion may be approximately one third of the total capacity of the battery 208.

When the operating mode 608 is in the tenth mode, the switch control module 240 controls the switches 232 of the battery 208 based on a tenth predetermined capacity allotment. The tenth predetermined capacity allotment may include, for example, connecting fourteenth, fifteenth, and sixteenth predetermined portions of the total capacity of the battery 208 to the first, second, and third positive terminals, 210, 214, and 216, respectively. The fourteenth predetermined portion may be, for example, approximately one half of the total capacity of the battery 208, the fifteenth predetermined portion may be approximately one third of the total capacity of the battery 208, and the sixteenth predetermined portion may be approximately one sixth of the total capacity of the battery 208.

When the operating mode 608 is in the eleventh mode, the switch control module 240 controls the switches 232 of the battery 208 based on an eleventh predetermined capacity allotment. The eleventh predetermined capacity allotment may include, for example, connecting seventeenth, eighteenth, and nineteenth predetermined portions of the total capacity of the battery 208 to the first, second, and third positive terminals, 210, 214, and 216, respectively. The seventeenth predetermined portion may be, for example, approximately two thirds of the total capacity of the battery 208, the eighteenth predetermined portion may be approximately one sixth of the total capacity of the battery 208, and the nineteenth predetermined portion may be approximately one sixth of the total capacity of the battery 208.

When the operating mode 608 is in the twelfth mode, the switch control module 240 controls the switches 232 of the battery 208 based on a twelfth predetermined capacity allotment. The twelfth predetermined capacity allotment may include, for example, connecting twentieth, twenty first, and twenty second predetermined portions of the total capacity of the battery 208 to the first, second, and third positive terminals, 210, 214, and 216, respectively. The twentieth predetermined portion may be, for example, approximately zero percent of the total capacity of the battery 208, the twenty first predetermined portion may be approximately one half of the total capacity of the battery 208, and the twenty second predetermined portion may be approximately one half of the total capacity of the battery 208.

When the operating mode 608 is in the thirteenth mode, the switch control module 240 controls the switches 232 of the battery 208 based on a thirteenth predetermined capacity allotment. The thirteenth predetermined capacity allotment may include, for example, connecting twenty third, twenty fourth, and twenty fifth predetermined portions of the total capacity of the battery 208 to the first, second, and third positive terminals, 210, 214, and 216, respectively. The twenty third predetermined portion may be, for example, approximately one sixth of the total capacity of the battery 208, the twenty fourth predetermined portion may be approximately zero percent of the total capacity of the battery 208, and the twenty fifth predetermined portion may be approximately five sixths of the total capacity of the battery 208.

When the operating mode 608 is in the fourteenth mode, the switch control module 240 controls the switches 232 of the battery 208 based on a fourteenth predetermined capacity allotment. The fourteenth predetermined capacity allotment may include, for example, connecting twenty sixth, twenty seventh, and twenty eighth predetermined portions of the total capacity of the battery 208 to the first, second, and third positive terminals, 210, 214, and 216, respectively. The twenty sixth predetermined portion may be, for example, approximately one sixth of the total capacity of the battery 208, the twenty seventh predetermined portion may be approximately five sixths of the total capacity of the battery 208, and the twenty eighth predetermined portion may be approximately zero percent of the total capacity of the battery 208.

When a fault is detected in one of the batteries 224, the switch control module 240 electrically isolates that one of the batteries 224 and prevents that one of the batteries 224 from being connected to any of the positive terminals directly or indirectly. The switch control module 240 also updates (decreases) the total capacity of the battery 208 when a fault is present in one of the batteries 224. When a fault is detected in one of a plurality of the batteries 224 used to output power to the first positive terminal 210, the switch control module 240 electrically isolates that one of the batteries 224 and connects one or more other ones of the batteries 224 to provide the same power output to the first positive terminal 210.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery system, comprising:
a first node;
a second node;
a third node configured to be connected to a ground potential;
a switch connected between the first node and the second node;
a battery having a first terminal connected to the first node and a second terminal configured to selectively be connected to the ground potential;
an analog to digital converter (ADC) configured to generate a first output based on current through the switch; and
a digital to analog converter (DAC) configured to generate a second output based on the first output; and
a comparator configured to control the switch based on a comparison of a third output of the comparator with the second output of the DAC.

2. The battery system of claim 1 wherein the DAC is configured to generate the second output based on a first voltage at the first node and a second voltage at the second node.

3. The battery system of claim 2 wherein the DAC is configured to generate the second output further based on a predetermined voltage change.

4. The battery system of claim 3 wherein the DAC is configured to set the second output to cause the comparator to transition the switch to open when the first voltage minus the second voltage is greater than the predetermined voltage change.

5. The battery system of claim 4 wherein the DAC is configured to set the second output to cause the comparator to transition the switch to closed when the first voltage minus the second voltage is less than the predetermined voltage change.

6. The battery system of claim 1 wherein the DAC is configured to generate the second output based on a predetermined rate of change of current.

7. The battery system of claim 1 further comprising a charge pump configured to power the comparator.

8. The battery system of claim 1 further comprising:
a second battery having a third terminal and a fourth terminal, the fourth terminal configured to selectively be connected to the ground potential; and
a second switch connected between the third terminal of the second battery and the second terminal of the battery.

9. The battery system of claim 8 further comprising a third switch connected between the second terminal of the battery and the ground potential.

10. The battery system of claim 8 wherein the battery is an individually housed 12 Volt battery and the second battery is an individually housed 12 Volt battery.

11. A vehicle comprising the battery system of claim 1.

12. A battery system, comprising:
a first node;
a second node;
a third node configured to be connected to a ground potential;
a first switch connected between the first node and the second node;
a first battery having a first terminal and a second terminal, the first terminal connected to the first node;
a fourth node connected to the second terminal;
a second switch connected between the fourth node and the ground potential;
a second battery having a third terminal and a fourth terminal;
a third switch connected between the third terminal of the second battery and the fourth node;
a fifth node connected to the fourth terminal;
a fourth switch connected between the fifth node and the ground potential;
an analog to digital converter (ADC) configured to generate a first output based on current through the first switch; and
a digital to analog converter (DAC) configured to generate a second output based on the first output;
a comparator configured to control the first switch based on a comparison of a third output of the comparator with the second output of the DAC; and
a switch control module configured to control the second, third, and fourth switches.

13. The battery system of claim 12 further comprising:
a third battery having a fifth terminal and a sixth terminal;
a fifth switch connected between the fifth node and the fifth terminal of the third battery;
a sixth node connected to the sixth terminal; and
a sixth switch connected between the sixth node and the ground potential.

14. The battery system of claim 13 further comprising:
a fourth battery having a seventh terminal and an eighth terminal, the eighth terminal connected to the ground potential; and
a seventh switch connected between the sixth node and the seventh terminal of the fourth battery.

15. The battery system of claim 14 wherein the first, second, third, and fourth batteries are individually housed 12 Volt batteries.

16. The battery system of claim 12 further comprising a charge pump configured to power the comparator.

* * * * *